Oct. 6, 1970  G. J. GRASSELER  3,532,377
CAB ENCLOSURES

Original Filed Nov. 24, 1967  2 Sheets-Sheet 1

GEORGE J. GRASSELER
INVENTOR.

BY

*Joseph S. Iandiorio*

ATTORNEY.

Oct. 6, 1970   G. J. GRASSELER   3,532,377
CAB ENCLOSURES
Original Filed Nov. 24, 1967   2 Sheets-Sheet 2

GEORGE J. GRASSELER
INVENTOR.

BY
Joseph S. Iandiorio
ATTORNEY.

United States Patent Office

3,532,377
Patented Oct. 6, 1970

3,532,377
CAB ENCLOSURES
George John Grasseler, Stow, Mass., assignor to G & G Engineering Corporation, Watertown, Mass., a corporation of Massachusetts
Original application Nov. 24, 1967, Ser. No. 685,449, now Patent No. 3,472,147, dated Oct. 14, 1969. Divided and this application Jan. 29, 1969, Ser. No. 822,336
Int. Cl. B62d 33/06
U.S. Cl. 296—28                  2 Claims

ABSTRACT OF THE DISCLOSURE

An air processing system including a unit having a housing with inlet and outlet ports, a fan for drawing air into the inlet port and forcing it out the outlet port, a rotatable dispersion shell having a dispersing surface extending in the direction of the axis of rotation of the shell for creating, from water directed against it, a moist atmosphere between the inlet and outlet ports, a reservoir of water associated with the housing, a pump for moving water from the reservoir and directing it against the dispersing surface, drive means for driving the fan, the pump, and the dispersion shell, and further including means for mounting the housing to a vehicle cab, a transparent enclosure included with the vehicle cab for preventing loss of processed air from the cab while increasing the field of view, and a relief mechanism to prevent excessive pressure build-up in the cab.

---

This is a division of application Ser. No. 685,449, filed Nov. 24, 1967, now U.S. Pat. 3,472,147.

BACKGROUND OF INVENTION

This invention relates to air processing systems and, more particularly, to such systems for cleaning, cooling, moistening, and pressurizing air supplied to vehicle cabs.

Operators of heavy-duty vehicles such as farm machinery, heavy construction equipment and street sweepers often suffer serious health problems due to the contamination and dust in the air that they breathe in the vehicle cabs. In addition, the hot, dusty, often very dry air in the cab contributes heavily to the discomfort of the operators so that experienced operators for such vehicles may be expensive to employ, may work for only short periods, and are in short supply.

Attempts to use air coolers, air cleaners and other types of air conditioners to provide clean cool air to the cabs has met with indifferent success. Contemporary air processing units are heavy, bulky, and often very expensive. Many of the units require much attention and servicing to keep them operating properly. Often the units have elaborate structures for keeping an internal filter member moist for increased air filtering efficiency; some units have used a whirling disc to hurl water at the filter.

Often the apparatus may be ineffective because its function of supplying uncontaminated air is rendered ineffective by the abundance of contaminated air entering the cab through cracks and leaks in the structure. In addition, the operators of these machines often must open cab doors or windows in order to observe the area immediately adjacent the vehicle body or proximate the operative mechanism of the machine.

SUMMARY OF INVENTION

Thus it is desirable to provide an air processing system capable of maintaining an atmosphere of cool, clean, moist air in a vehicle cab at a pressure above that of the air external to the cab.

It is further desirable to provide an inexpensive and compact air processing unit which converts hot, dusty air to cool, clean air and which is adaptable for use in an air processing system.

It is further desirable to provide such a unit for humidifying the air as it is being cleaned.

It is further desirable to have such a unit providing a large volume of moist atmosphere for washing the air and for moistening an internal filter as well.

It is further desirable to provide such a system which is inexpensive to manufacture and install, and which requires a minimum of service in use.

It is further desirable to provide such a system for use in a vehicle cab having a transparent enclosure for preventing loss of the cleaned, cooled air to the contaminated atmosphere outside the cab while providing the operator with the required vantage point for observing certain movements and portions of the vehicle.

It is further desirable to provide such a system capable of maintaining the internal pressure of the cab at a level practically required to prevent leakage of air from outside the cab to inside the cab.

It is further desirable to provide means for limiting the pressure differential between the inside of the cab and the outside of the cab.

The invention may be accomplished by an air processing system including a unit comprising a housing having an inlet port for receiving air to be processed and an outlet port for delivering the processed air, means for moving air into the inlet port and out the outlet port, a rotatable dispersion shell having a dispersing surface extending in the direction of the axis of rotation of the shell for creating from fluid directed against it a moist atmosphere between the ports, a fluid reservoir associated with the housing, pump means for moving fluid from the reservoir and directing it against the dispersing surface, drive means for driving the dispersion shell and the pump means.

Other embodiments may include means for mounting the housing to a vehicle cab, a transparent enclosure included in the vehicle cab for preventing loss of processed air from the cab without impairing the field of view, and a relief mechanism to prevent excessive pressure in the cab.

DISCLOSURE OF PREFERRED EMBODIMENT

Other objects, features, and advantages will appear from the following description of a preferred embodiment, taken with the accompanying drawings, in which.

Figure 1:
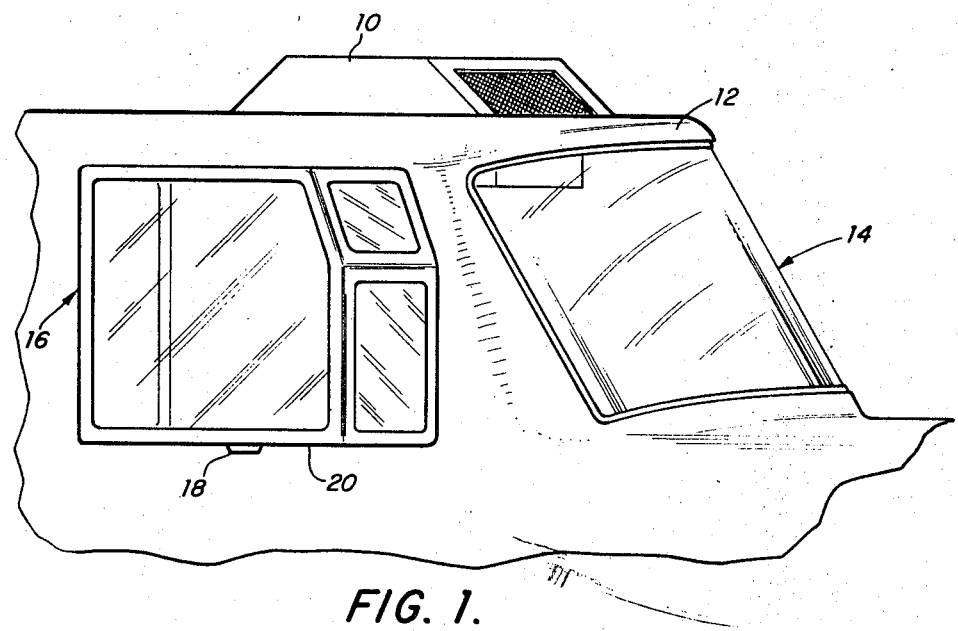
FIG. 1 is a view of a portion of a vehicle cab with an air processing system according to this invention.

In a specific embodiment the invention is practiced by installing an air cleaning and cooling unit 10 in the roof 12 of a vehicle cab 14 which is substantially sealed against air leakage. A relief valve may be used to prevent pressure differential between the cab interior and the external atmosphere from exceeding a predetermined, comfortable level, such as 2 or 3 pounds per square inch. To permit an operator in the cab to look out, down, or along the vehicle without opening a door or window and leaning his head through the opening, thereby losing the clean, cooled air provided by unit 10 and admitting unprocessed outside air, a transparent enclosure 16 may be provided either integral with, or detachable from, the cab. Enclosure 16 improves the field of view of the observer by extending the plane of vision beyond the normal contours of cab 14 so that portions of the cab do not block the view. The relief valve 18 may be mounted in enclosure 16 in the lower horizontal wall 20 which may also be transparent.

Figure 2:
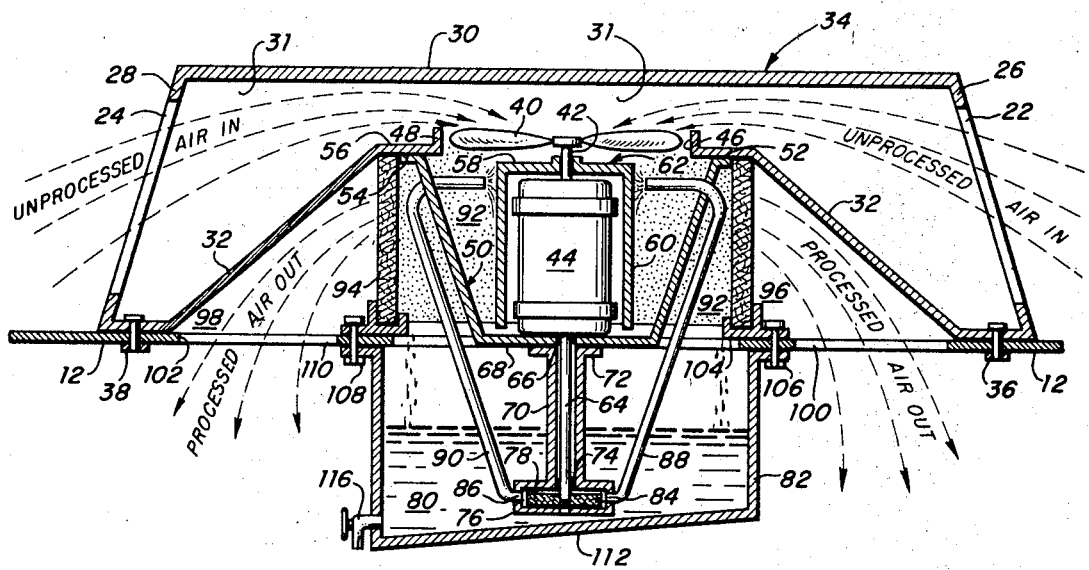
FIG. 2 is an enlarged, elevational, cross-sectional view of the air cleaning and cooling unit of the system according to this invention.
Figure 3:
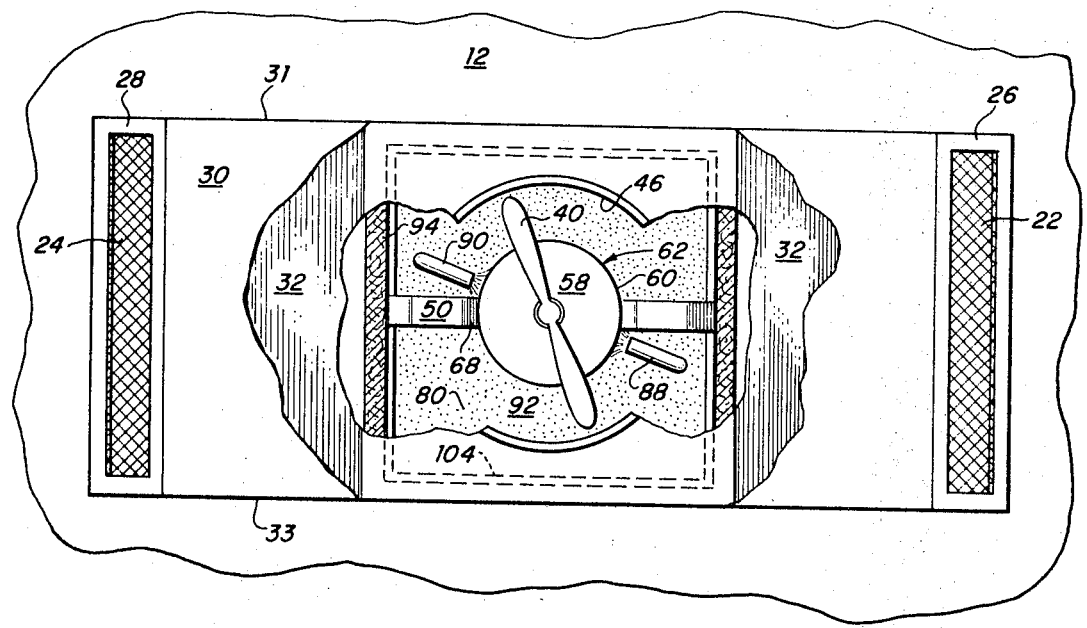
FIG. 3 is a partially broken away plan view of the unit of FIG. 2.
Figure 4:
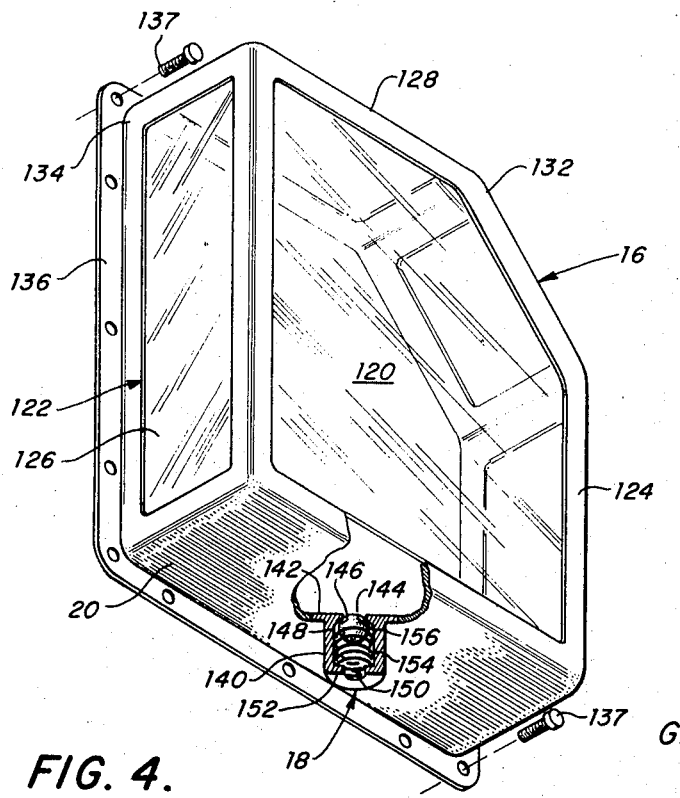
FIG. 4 is a perspective view of an enclosure with a relief valve for use in the system according to this invention.

Unit 10 is shown in more detail in FIG. 2. Unprocessed air is drawn into unit 10 through screened ports 22 and 24 in end walls 26 and 28, respectively, extending between upper and lower walls 30 and 32 which together with side walls 31 and 33, FIG. 3, form housing 34 mounted to roof 12, such as by bolts 36 and 38. Unprocessed air is drawn into unit 10 by fan 40, driven on shaft 42 by motor 44, and situated in circular port 46 which has upstanding rim 48. Motor 44 is supported by bracket 50 suspended at diametrically opposed positions 52, 54 from raised portion 56 of lower wall 32 adjacent to rim 48.

Sealably connected to shaft 42 between fan 40 and motor 44 is web 58 which interconnects shaft 42 and cylindrical dispersing surface 60 to form a unitized shell 62 rotatable with shaft 42 and sealed to it. A second shaft 64 driven by motor 44 extends downward through seal 66 in horizontal portion 68 of bracket 50, through casing 70, fastened to portion 68 at flange 72, through seal 74 in pump housing, 76, and terminates at pump blade 78. As shaft 64 is driven by motor 44, water 80, drawn through an inlet not shown in housing 76 from reservoir 82, is pumped by blade 78 through apertures 84 and 86 in housing 76 to conduits 88 and 90, respectively, which direct the water at opposite sides of dispersing surface 60 as it is rotated by shaft 42.

The water directed against spinning dispersing surface 60 is atomized to form a large volume of moist atmosphere 92 through which unprocessed air is driven by fan 40. The moist atmosphere provides a number of useful functions: as the unprocessed air moves through moist atmosphere 92, the dust particles are caught in the moisture and precipitated out of the air; the moisture evaporates, cooling the air; the moist atmosphere and water droplets dispersed by surface 60 soak filter 94, thereby improving its filtering qualities; relative humidity of the air is increased. The air leaving filter 94 passes through conduits 96 and 98, partially formed by lower wall 32 and side walls 31 and 33, and exits into cab 14 through vents 100 and 102.

Filter 94 rests in peripheral lip 104 mounted to roof 12, such as by bolts 106, 108 which may also serve to fasten reservoir 82 by means of flange 110 to the underside of roof 12. Lip 104 contains drain holes for permitting excess water in filter 94 to drip down into reservoir 82, for which purpose lip 104 preferably is positioned within the periphery of reservoir 82. The bottom 112 of reservoir 82 is preferably sloped toward one side where is located a drain cock 116 to permit removal of dirty water.

The elongated cylindrical shape of surface 60 disperses the water over a large area to form an extended volume of moist atmosphere: the increased volume of moist air increases the duration and extent of exposure of incoming air to the cleansing properties of the moist air and provides increased washing and filtering of the incoming air. In addition, the elongated shape of surface 60 insures more positive saturation of filter 94 in the vertical dimension.

The particular configuration of unit 10 in FIGS. 2 and 3 is not required by the invention. For example, filter 94 may be positioned before or after atmosphere 92 or may be completely eliminated; fan 40 may be oriented in any direction or be made unnecessary by movement through an air mass of the vehicle on which unit 10 is mounted: fan 40, shell 62, and pump blade 78 may be driven by separate motors, or by separate transmission devices through the same motor, shell 62 may be conical, semispherical, or any of various other geometric shapes which will substantially extend along its axis of rotation; surface 60 need not be a complete surface in the direction of rotation and web 58 need not be sealably interconnected between surface 60 and shaft 42; the number and arrangement of means for directing water to surface 60 is not restricted to that shown. The fluid used to clean and cool the air in unit 10 need not be water; other suitable fluid or fluids, or combinations thereof, may as well be used.

Motor 44 may be driven with power derived from the vehicle in which it is mounted through an on-off switch having provision for two fan speeds that provide air flow at either 500 or 1000 cubic feet per minute. Air flow at these rates causes an increase in pressure in enclosed spaces such as the vehicle cab shown in FIG. 1, so that the clean air at higher pressure is forced out through minor cracks and leaks in the cab, thereby preventing dirty air, at lower pressure, from being forced into the cab through those same leaks and cracks.

In much of the equipment in which the invention is used the operator in the cab must often view the ground or the operating mechanism—plows, brushes, etc.—near the body or the cab of the vehicle. Generally this is done in open cabs by leaning over the side or in closed cabs by leaning out open doors or windows. For best efficiency the cab should be closed so that some pressure differential over external atmospheric conditions can be maintained. To provide a pressurized cab and yet permit the plane of the operator's field of view to extend beyond the cab and/or vehicle portions, the system includes transparent enclosure 16, FIG. 4, which may be either integral with the cab or detachable therefrom. Enclosure 16 includes a transparent section 120 substantially parallel to and spaced from cab 14 by a peripheral wall 122 having front 134, rear 126, upper 128, lower 20, and inclined-forward 132 sections, any one or all of which may be formed of transparent material. These sections are disposed in a rigid frame 134 which, if the enclosure is to be separate and detachable from the cab, may be provided with mounting flange 136 for locating mounting bolts 137, gaskets, and the like. The frame and sections, especially the transparent sections, are preferably made of abrasive-resistant material to permit deposits of dust accumulating on them in the statically charged atmosphere of the cab to be wiped from them without scratching and marring their finish and impairing their transparency.

Relief valve 18 shown mounted in enclosure 16 in FIGS. 1 and 4 may as well be mounted in other parts of the cab. When enclosure 16 is formed as a detachable member it is preferable to have valve 18 mounted in the enclosure so that attaching the enclosure simultaneously installs the relief valve. Relief valve 18 includes a housing 140 with a mounting flange 142 at one end. Inner vent hole 144 opens into a conical seat 146 at the upper end of bore 148. Lower vent hole 150 adjoins an annular lip 152 that supports spring 154 which biases ball 156 upward against seat 146 in the normally closed position. When the pressure at seat 146 exceeds that at seat 150 by two pounds per square inch, the force of spring 154 is overcome and the valve opens to vent the excess pressure.

Other embodiments of the air processing system and the cleaning and cooling unit will occur to those skilled in the art and are within the following claims.

What is claimed is:

1. A transparent enclosure for a vehicle cab, said enclosure being arranged to protrude beyond said vehicle cab contours for extending the field of observation from said cab in a plane generally parallel to the plane of the cab wall at which said enclosure is located and for preventing substantial venting of the internal atmosphere to the atmosphere external to said cab, said enclosure including a first section having an abrasive-resistant transparent segment generaly parallel to the wall of said cab at which said enclosure is located, a second section extending between said first section and said cab and sealingly interconnected with said cab, said second section having at least one abrasive-resistant transparent segment, a frame member interconnecting said first and second sections to form said enclosure, and a relief valve mounted in said enclosure for venting the internal atmosphere of said cab to the atmosphere external to said cab when said internal atmosphere exceeds a predetermined pressure differential relative to said external atmosphere.

2. The enclosure of claim 1 in which said enclosure is separate and removable from said cab and further including fastening means for securing said enclosure to said cab and removing said enclosure from said cab.

References Cited

UNITED STATES PATENTS

| 2,442,236 | 5/1948 | Fagan | 160—88 |
| 2,641,501 | 6/1963 | Ensey | 98—2 |
| 3,249,382 | 5/1966 | Swithenbank | 296—24 |

BANJAMIN HERSH, Primary Examiner

J. A. PEKAR, Assistant Examiner

U.S. Cl. X.R.

98—2